United States Patent [19]

Yamashita et al.

[11] 4,269,713

[45] May 26, 1981

[54] ETHYLENE-VINYL ALCOHOL COPOLYMER MEMBRANE AND A METHOD FOR PRODUCING THE SAME

[75] Inventors: Shuzo Yamashita; Syuji Kawai; Hirokuni Tanii, all of Kurashiki; Koichi Takakura, Okayama, all of Japan

[73] Assignee: Kuraray Co., Ltd., Kurashiki, Japan

[21] Appl. No.: 71,671

[22] Filed: Aug. 31, 1979

[30] Foreign Application Priority Data

Sep. 7, 1978 [JP] Japan .............................. 53-110259
Apr. 30, 1979 [JP] Japan ................................ 54-53730

[51] Int. Cl.³ .................... B01D 39/18; B01D 31/00; B01D 13/00
[52] U.S. Cl. ................................. 210/500.2; 264/41; 428/398
[58] Field of Search ................. 264/41; 428/398, 376; 210/500 M

[56] References Cited

U.S. PATENT DOCUMENTS

| 3,817,880 | 6/1974 | Kreider | 264/41 |
| 3,907,675 | 9/1975 | Chapurlat et al. | 264/41 |
| 3,957,935 | 5/1976 | Staude | 264/41 |
| 4,061,821 | 12/1977 | Hayano et al. | 264/41 |
| 4,134,837 | 1/1979 | Yamashita et al. | 264/41 |

Primary Examiner—William J. Van Balen
Attorney, Agent, or Firm—Barry Kramer

[57] ABSTRACT

There is described an ethylene-vinyl alcohol copolymer membrane comprising at least a skin layer on its surface and a porous layer supporting the skin layer. The porous layer, when the membrane is observed in the dry state with an electron microscope, contains vacuoles or voids, which present a mono- or multi-layer structure and have straight-line lengths corresponding to 20-99% of the whole thickness of the membrane. In addition, the polymer portion of the porous layer has micropores with an average pore diameter of 0.1-5 microns and the membrane has a porosity of 60-90%.

6 Claims, 6 Drawing Figures

ETHYLENE-VINYL ALCOHOL COPOLYMER MEMBRANE AND A METHOD FOR PRODUCING THE SAME

BACKGROUND OF THE INVENTION

1. Field of the Invention

This invention relates to ethylene-vinyl alcohol (EVA) copolymer membranes useful as separation membranes having good water permeability and more particularly to novel EVA copolymer membranes comprising a skin layer and a porous layer having a specific structure.

2. Description of the Prior Art

Various membranes have heretofore been developed as dialysis or ultrafiltration membranes for medical and industrial uses. The present inventors have been searching for EVA copolymer membranes having good biocompatibility, good antihemolytic and antithrombotic properties, good durability and good chemical stability, and have already developed an EVA membrane having a homogeneous structure.

The previously developed homogeneous structure EVA membrane has an excellent performance for a dialysis membrane and is being put to practical use as a membrane for artificial kidneys. It has a structure formed by particles having an average diameter in the range of 100–10,000 Angstrom units bonded to each other, said structure being substantially free from pores in excess of 2 microns in diameter.

Generally, in addition to the homogeneous structure membrane such as mentioned above, there is another kind of membrane, which is the so-called asymmetrical membrane having a skin layer. While asymmetrical membranes made from cellulose acetate or polyacrylonitrile are known in the art, asymmetrical membranes from EVA polymers are scarecely known. One example of an asymmetrical EVA membrane appears in Japanese Patent Application Laid Open No. 53-77833, which discloses asymmetrical type EVA membranes for use as separator membranes for storage batteries. This membrane comprises a skin layer and a porous supporting layer thereunder. However, said porous layer, i.e. the supporting layer, has a honeycomb structure with pore sizes of 0.05–10 microns, said structure being essentially different from the structure of the membrane provided by the present invention.

The present inventors have endeavored to obtain an EVA copolymer membrane with a more improved water permeability, and have now succeeded in obtaining an asymmetrical membrane having large vacuoles or voids in the porous layer, and a high porosity.

SUMMARY OF THE INVENTION

The present invention provides an improved ethylenevinyl alcohol copolymer membrane and processes for preparing it. The membrane comprises at least a skin layer on the surface thereof and a porous layer supporting said skin layer, wherein said porous layer, when said membrane is observed in the dry state with an electron microscope, comprises a plurality of vacuoles or voids, which present a mono- or multi-layer structure, with an average straight-line length corresponding to 20–99% of the whole thickness of the membrane, and the polymer portion of said porous layer comprises micropores with an average diameter of 0.1–5 microns, and said membrane has a porosity of 60–90%.

One process according to the invention, for producing a flat membrane comprises dissolving an ethylene-vinyl alcohol copolymer in a solvent consisting essentially of at least one compound selected from the group consisting of dimethyl sulfoxide, dimethylacetamide, N-methylpyrrolidone and pyrrolidone to a polymer concentration, C, of 10–40% by weight, and coagulating the resulting solution in an aqueous coagulation bath, at a coagulation bath temperature, T°C, which satisfies the following relation:

when $10 \leq C < 25$, $C - 10 \leq T \leq C + 30$, and
when $25 \leq C \leq 40$, $C - 8 \leq T \leq C + 30$.

Also provided according to the invention are wet and dry-wet processes for preparing hollow fiber membranes. In both of these, an ethylene-vinyl alcohol copolymer is dissolved in a solvent consisting essentially of at least one compound selected from the group consisting of dimethyl sulfoxide, dimethyl acetamide, N-methylpyrrolidone and pyrrolidone. In the wet process, where the solution is extruded directly into a coagulating liquid, the polymer concentration, C, will be 10–40% and the coagulation bath temperature, T, will be as defined above. In the dry-wet process, where the solution is extruded through and drafted in an air gap prior to passing it through a coagulation bath, the concentration, C, will be 15–40% and the coagulation temperature, T°C will satisfy the following relation:

when $15 \leq C \leq 40$, $\frac{1}{2}C + 3.5 \leq T \leq \frac{1}{2}C + 20$.

BRIEF DESCRIPTION OF THE DRAWINGS

The invention will be better understood and some of its advantages will become more apparent from the following detailed description, especially when read in light of the attached drawings, wherein.

DETAILED DESCRIPTION OF THE INVENTION

Figure 1:
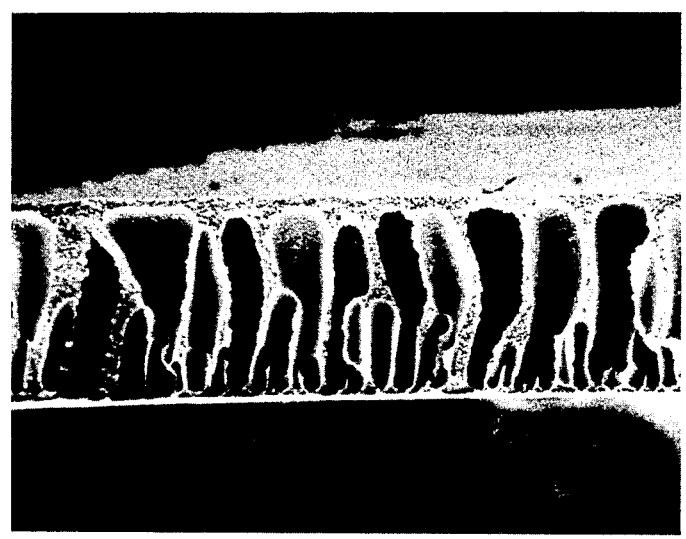
FIG. 1 is an electron photomicrograph, at a magnification of 240 times, of a cross-sectional structure of a membrane obtained according to the invention.

The ethylene-vinyl alcohol copolymer to be used in this invention may be a random, block or graft copolymer. However, if the ethylene content is below 10 mole %, wet mechanical properties of the resulting membrane are insufficient and the amount of elution therefrom, is large, and if the ethylene content is above 90 mole %, decreased biocompatibility and permeability characteristics result. Therefore, ethylene contents of 10-90 mole %, especially 15-60 mole %, are preferred. Such ethylene-vinyl alcohol copolymers are distinguished from polyvinyl alcohol in that the amount of eluted substance is very small, and therefore are suited as materials for making blood treating membranes in the field of the medicine.

As regards the degree of the saponification of said ethylene-vinyl alcohol copolymer, it should be 80 mole % or more, preferably 95 mole % or more. If it is below 80 mole %, the wet mechanical properties of the membrane are insufficient. Usually, said copolymer is used in the substantially completely saponified state, i.e. with a saponification degree of 99 mole % or more. The ethylene-vinyl alcohol copolymer may be a copolymer of ethylene, vinyl alcohol and such other copolymerizable monomer or monomers as methacrylic acid, vinyl chloride, methyl methacrylate, acrylonitrile or vinylpyrrolidone with the content of said other monomer or monomers being 15 mole % or below. Said copolymer may also be crosslinked before or after membrane formation by treating the same with an inorganic crosslinking agent such as a boric compound or an organic crosslinking agent such as a diisocyanate or a dialdehyde. Further, it may be a copolymer acetalized with an aldehyde such as formaldehyde, acetaldehyde, butyraldehyde or benzaldehyde to the extent of not more than 30 mole % of the functional hydroxyl groups in the vinyl alcohol units. Preferably, the ethylene-vinyl alcohol copolymer to be used in this invention has a viscosity of 1.0-50 centipoises as measured for a 3 weight % solution in dimethyl sulfoxide at 30° C. with a B type viscometer. If the viscosity is below said range, i.e. if the degree of polymerization is lower, those mechanical properties that are necessary for a membrane cannot be obtained, and if the viscosity exceeds said range, membrane formation is difficult.

The EVA membrane of the invention has a dense layer on one side or both sides thereof. This so-called skin layer determines the permeability and cut-off performance of the membrane. Although it is very difficult to state explicitly the microstructure of said skin layer, observation of a dry membrane with an electron microscope shows that the layer has minute openings of not more than 5,000 Angstrom units across.

The skin layer has a porous supporting layer thereunder. Since such porous layer constitutes a kind of barrier to the skin layer, the structure of the porous layer has a great influence upon the performance of the membrane. The structure of the porous layer of the membrane of the invention is such that the vacuoles or voids present a mono- or multi-layer structure and have an averge straight-line length corresponding to 20-90% of the membrane thickness. Therefore, the porosity of said layer is very great. Furthermore, the polymer portion or phase of the porous layer has micropores having an average diameter of 0.1-5 microns, and therefore is of a relatively porous structure. Thus, said porous layer is characterized in that it has vacuoles or voids and at the same time the polymer portion thereof itself is porous. When coagulation proceeds from one side of the membrane, a monolayer vacuole structure is apt to form, and, when coagulation goes on from both sides, a multi-layer structure having two or more layers may result.

One of the present inventors has filed a patent application, Japanese Patent Application No. 52-108,251 corresponding to U.S. Ser. No. 962,962, filed Nov. 22, 1978, on an invention concerning an asymmetrical membrane having a specific structure as obtained from a specific EVA composition. This membrane is made from a specific composition comprising two kinds of EVA copolymers different in ethylene content, and therefore is different from the membrane of the present invention which is obtained from a single EVA copolymer. Moreover, the porous layer of the former membrane has a specific structure comprising cylindrical voids having lengths of at most 90% of the membrane thickness and sperical voids having sizes of the order of microns. In the membrane of the present invention, the porous layer comprises substantially one single kind of vacuoles or voids in respect of shape or configuration. It is clear also from the electron photomicrograph shown in FIG. 5 that the former membrane and the membrane of the present invention are different in the shape of the voids.

Figure 2:
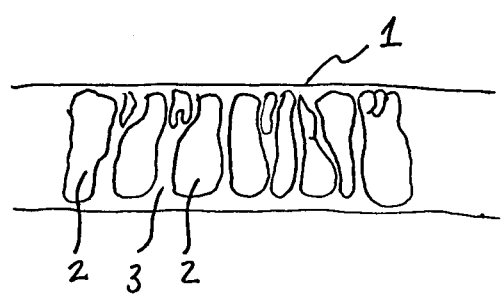
FIG. 2 is a schematic representation of the structure shown in FIG. 1.

FIG. 1 is an electron photomicrograph (magnification 240 times) of an example of the membrane according to the present invention. The membrane has a monolayer vacuole structure. FIG. 2 is a schematic representation of the same. Referring to FIG. 2, the method of measuring the straight-line lengths of vacuoles is now described.

The membrane comprises a skin layer 1 on the membrane surface, vacuoles or voids 2 and a polymer portion or phase 3 of the porous layer. The "straight-line" of a vacuole means the length of the longest line connecting both ends of the vacuole on a straight line drawn in the direction of the membrane thickness. In the case of a multilayer vacuole structure, it means the sum total of such lengths of vacuoles in respective layers. That the vacuoles or voids have those straight-line lengths that correspond to 20-99% of the membrane thickness means that the vacuoles or voids are very large as compared with the membrane thickness. However, as can be understood from FIG. 1 and FIG. 2, the shape of the vacuole should not be construed high critically. It should be understood that a small number of relatively small vacuoles may be present. Such small number of small vacuoles can be thought to have little influence on the fundamental structure of the membrane according to the invention.

Figure 3:
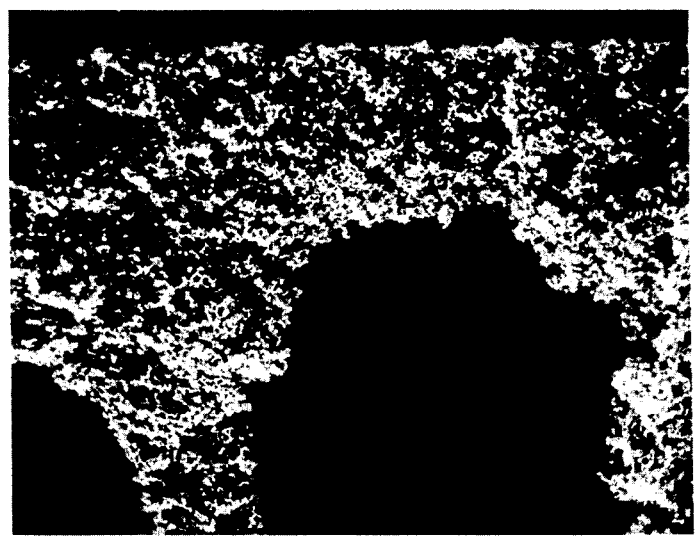
FIG. 3 is an electron photomicrograph, at a magnification of 2,400 times, showing the structure of the membrane in the neighborhood of the skin layer.
Figure 4:
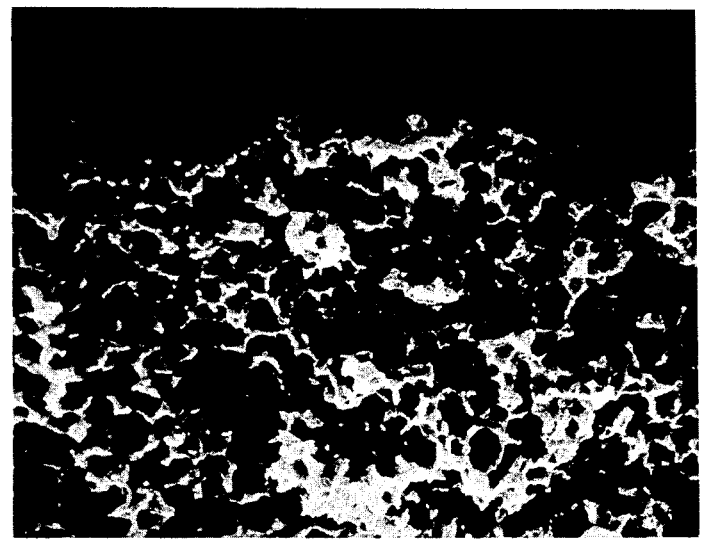
FIG. 4 shows the structure of FIG. 3 at a magnification of 12,000 times.

FIG. 3 is an electron photomicrograph (magnification 2400 times) showing the polymer portion of the porous layer in the neighborhood of the skin layer. FIG. 4 is a more enlarged photomicrograph (magnification 12,000 times) of the same portion.

Figure 5:
FIG. 5 is an electron photomicrograph showing a cross-sectional structure, at a magnification of 600 times, of a hollow fiber membrane according to the invention.
Figure 6:
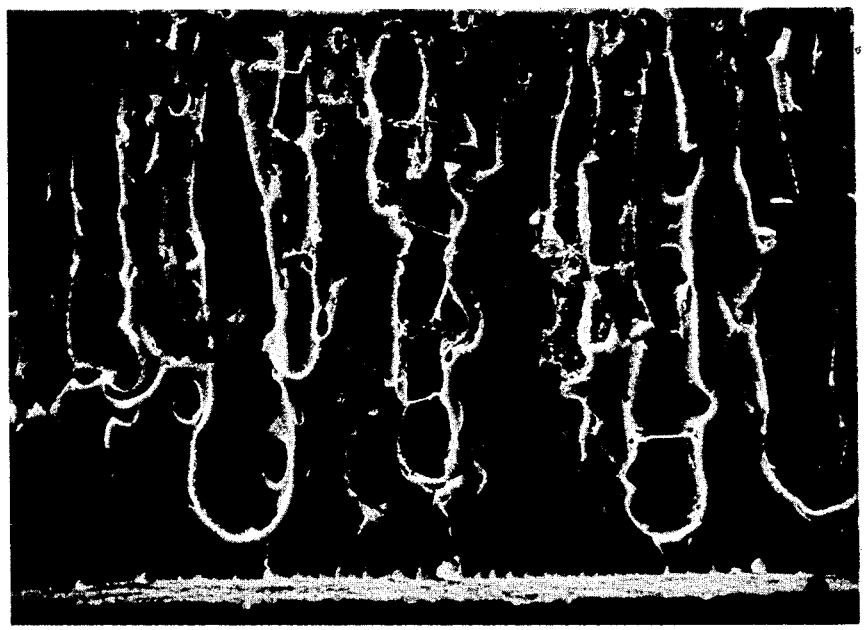
FIG. 6 is an electron photomicrograph at a magnification of 1,200 times of a membrane obtained according to Japanese Patent Application No. 52-108,251 corresponding to U.S. Ser. No. 962,962, filed Nov. 22, 1978.

The microstructure of said polymer portion can clearly be ascertained from FIG. 4. FIG. 5 shows a cross-sectional structure (magnification 600 times) of a hollow fiber membrane embodiment of the invention.

The porosity as used herein is calculated from the following formula:

$$(1 - \frac{Pa}{Pr}) \times 100\ (\%)$$

where Pa is the apparent density of a membrane and Pr is the density of the membrane having no pores and voids.

The membrane of the present invention can take any desired form such as flat sheet, tube or hollow fiber, which are formed by methods known per se. In the case of a flat membrane, the membrane thickness may be about 10-2,000 microns, and in the case of a hollow fiber, the outer diameter may be about 40-3,000 microns, preferably 100–2,000 microns, and the membrane thickness may be about 10–1,000 microns, preferably 20–500 microns.

The EVA membrane of the present invention has a water permeability not less than 20 m.m$^2$·hr·mmHg, a uric acid permeability of not more than $120 \times 10^{-4}$ cm/min. and a vitamin $B_{12}$ permeability of not more than $25 \times 10^{-4}$ cm/min. Such membrane can be used as a filtering membrane in a hemofiltration type artificial kidney, as a membrane for filtering and/or concentrating accumulated ascites, and also as a filter membrane for use in various industrial liquids.

In this invention, electron photomicrographs are prepared in the following manner. A dried membrane obtained by the process of the invention is frozen in liquid nitrogen, and broken to prepare a fracture. Gold is then deposited on the fracture to the thickness of about 100 Angstrom units by a vapor deposition technique. Observation or photomicrography is carried out using a Hitachi electron microscope model HFS-2.

While a great number of solvents for the above-mentioned ethylene-vinyl alcohol copolymer are known including monohydric alcohols such as methanol and ethanol, polyhydric alcohols such as ethylene glycol, propylene glycol and glycerol, phenol, m-cresol, N-methylpyrrolidone and formic acid, and mixtures of them with water, it is preferable according to the method of the present invention for the production of separation membranes with well-balanced and desirable water permeability and solute permeability, to use a solvent selected from the group consisting of dimethyl sulfoxide, dimethylacetamide, N-methylpyrrolidone, pyrrolidone and mixtures thereof. The most preferable solvent is dimethyl sulfoxide in which ethylene- vinyl alcohol copolymers are highly soluble. The above-mentioned solvent to be used in dissolving the ethylene-vinyl alcohol copolymer, especially dimethyl sulfoxide, may contain such other solvent as water, methanol, isopropyl alcohol or dimethylformamide, or other liquid miscible with said solvent, and/or an inorganic salt, provided that the precipitation temperature (temperature at which the ethylene-vinyl alcohol copolymer begins to precipitate by cooling gradually after said copolymer is completely dissolved in a solvent) is not higher than 60° C.

The ethylene-vinyl alcohol copolymer is dissolved in the above-mentioned solvent at a concentration of 10–40% by weight. More specifically, in the production of flat membranes, concentrations of 10–40% by weight are preferable, and in the production of hollow fiber membranes, concentrations of 10–40% by weight are preferable for wet coagulation processes and of 15–40% by weight for dry-wet coagulation processes. In the production of hollow fiber membranes by the dry-wet coagulation processes, concentrations of not less than 15% are desirable for the purpose of improving spinnability of the hollow fiber. The temperature of the polymer solution is preferably 0°–120° C., more preferably 5°–60° C. At higher temperatures, there is the possibility of polymer deterioration, whereas at lower temperatures, membrane formation becomes difficult because of much higher viscosity of the solution.

The coagulating agent to be used in the coagulation bath is an aqueous medium. Said aqueous medium may be either water alone or a mixture of water and a water-miscible organic solvent, usually the same solvent as used in the polymer solution, with a content of said solvent up to 70% by weight. The coagulation bath may further contain an inorganic salt dissolved therein, such as sodium sulfate.

The EVA copolymer membrane of the present invention can be produced either by the wet coagulation process which comprises extruding a polymer solution directly into a coagulation bath or by the dry-wet coagulation process comprising first extruding a polymer solution into a gaseous atmosphere and then introducing the extruded product into a coagulation bath to cause coagulation of the same. It is a novel finding obtained by the present inventors that both the wet coagulation process and the dry-wet coagulation process give membranes having the same structure from a solution of the EVA polymer.

Thus, a flat membrane and a hollow fiber membrane each having the structure described herein can be produced by the following wet coagulation process.

An EVA copolymer is dissolved in a solvent consisting essentially of at least one compound selected from the group consisting of dimethyl sulfoxide, diemthylacetamide, N-methylpyrrolidone and pyrrolidone to a polymer concentration, C, of 10–40% by weight, and the polymer solution is coagulated in an aqueous coagulation bath at a coagulation bath temperature, T°C., in the range defined by the following relation:

When $10 \leq C < 25$, $C - 10 \leq T \leq C + 30$,
more preferably $C - 10 \leq T \leq C + 20$, and
when $25 \leq C \leq 40$, $C - 8 \leq T \leq C + 30$,
more preferably $C - 8 \leq T \leq C + 20$.

In the production of a hollow fiber membrane by the wet coagulation process, the above-mentioned polymer solution is extruded through a spinneret for hollow fiber production into a coagulation bath at a temperature in the range defined above while introducing a noncoagulation fluid through the central aperture of the spinneret. In the hollow fiber membrane production, it is necessary to introduce such a noncoagulating gas as air or nitrogen gas or such a noncoagulating liquid as n-hexane, cyclohexane or cyclopentane through the central aperture of the spinneret for hollow fiber spinning so that hollow configuration may be achieved precisely. Especially when a noncoagulating liquid is introduced, a very round hollow fiber membrane having excellently uniform wall thickness can be obtained.

A hollow fiber membrane according to the present invention can also be produced by the dry-wet coagulation process. The hollow fiber membrane can be obtained by a process which comprises dissolving an EVA copolymer in a solvent consisting essentially of at least one compound selected from the group consisting of dimethyl sulfoxide, dimethylacetamide, N-methylpyrrolidone and pyrrolidone to a polymer concentration, C, of 10–40% by weight, extruding the polymer solution through a spinneret for hollow fiber spinning while introducing a coagulating liquid through the central aperture of the spinneret, subjecting the spun fiber to 0.5–20 times of drafting while passing the same through a gaseous atmosphere, and then coagulating the fiber in a coagulating bath at a temperature, T°C., in the range defined by the following relation:

When $15 \leq C \leq 40$, $\frac{1}{4}C + 3.5 \leq T \leq \frac{1}{4}C + 20$.

The coagulating liquid to be introduced through the central aperture of the spinneret for hollow fiber spinning may be water, a mixture of water and a water miscible organic solvent, or an aqueous solution of a salt such as sodium sulfate. Especially preferable is, however, an aqueous solution of the same solvent as used in the polymer solution with a water content of 20–100% by weight, preferably 45–100% by weight. The coagulating power of said solution is especially suited for the membrane structure formation.

The spun fiber extruded through the spinneret is first passed through a gaseous atmosphere. Since the spun fiber retains the fluidity (flowability) in said gaseous atmosphere, the spun fiber is drawn to form a highly round membrane configuration which is uniform in thickness. The spun fiber is also subjected to drafting in said gaseous atmosphere. The conditions of said drafting are important in this process. For attaining perfect roundness and uniform wall thickness, especially for obtaining a thinner membrane, a higher draft ratio is desirable. If, however, the draft ratio is too high, the membrane thickness will be too small, and pinhole-like defects are apt to occur on the membrane.

In practicing the invention, it is preferable that the spun fiber is subjected to 0.5–20 times drafting, more preferably 1–15 times of drafting. The distance between the nozzle or spinneret and the coagulation bath surface is preferably about 10–500 mm which forms the gaseous atmosphere.

The gaseous atmosphere is usually an open space. However, in case evaporation of the solvent is to be controlled, it is possible to arrange a covering member having a cylindrical or other appropriate shape so that an atmosphere may be filled with a vapor from the coagulation bath or with a separately supplied vapor, or through which a controlled stream of a gas or vapor is passed. By selecting the draft conditions, the microstructure of the skin layer on the outer surface of the hollow fiber membrane can be adjusted.

The spun fiber is then led to the coagulation bath and coagulated therein. The composition and temperature of the coagulation bath may each be selected from within a broad range. However, as a result of investigations by the present inventors, it has been found desirable to employ the same composition for the above-mentioned coagulation liquid introduced through the central aperture, as is used for the coagulation bath. Thus, the aqueous solution of the solvent used in the spinning solution, especially an aqueous solution of dimethylsulfoxide, is preferable. The amount of each component should be determined depending on such conditions as the kind of the coagulating liquid introduced through the central aperture of the spinneret and the coagulation temperature. Generally, the water content is 20–100% by weight.

The coagulation temperature is also one of the important factors influencing the formation of the membrane structure specified by the present invention. It has been found that the polymer concentration, C% by weight, of the spinning solution and the temperature, T°C., of the coagulation bath are each required to be in a specific range. Namely, the following relation must be satisfied:

When $15 \leq C \leq 40$, $\frac{1}{4}C + 3.5 \leq T \leq \frac{1}{4}C + 20$,
More preferably $\frac{1}{4}C + 10 < T \leq \frac{1}{4}C + 20$.

At higher temperatures, the resulting membrane has a porous structure in which micropores having sizes of about 0.1–10 microns are present throughout the membrane, hence the membrane according to the invention cannot be obtained.

The hollow fiber which has passed through the coagulation bath is, if necessary, further subjected to drawing between rollers, wet heat treatment, wet heat drawing, or the like, so as to adjust the membrane performance and mechanical characteristics. The fiber may be acetalized in the vinyl alcohol units in EVA copolymer with a monoaldehyde such as formaldehyde, acetaldehyde, chloroacetaldehyde or benzaldehyde, or with a dialdehyde such as glutaraldehyde, glyoxal or PVA dialdehyde, or further, there may be introduced an ester-crosslinkage by a diisocyanate such as phenylene diisocyanate or tolylene diisocyanate, or an ether-crosslinkage by epichlorohydrin. Especially preferable is the crosslinking with a dialdehyde such as glutaraldehyde because such crosslinking can improve heat durability, chemical resistance, strength, and dimensional stability of the membrane, to a large extent.

The hollow fiber membrane according to the invention can be used either as a wet membrane or as a dry membrane. Drying can be accomplished, for example, by the method comprising replacing the water contained in the hollow fiber by a water miscible organic solvent and incapable of dissolving the polymer, such as acetone, methanol or tetrahydrofuran, followed by removing the organic solvent e.g. by heating at a low temperature, the method comprising treating the fiber during or after the membrane formation with a polyhydric aliphatic alcohol such as ethylene glycol, diethylene glycol or glycerol, followed by drying by heating at a relatively low temperature, and the freeze drying method comprising freezing the wet membrane containing water in liquid nitrogen, for instance, followed by removing the water utilizing sublimation of water under reduced pressure.

The values given herein for permeability to water, uric acid or vitamin $B_{12}$ were obtained in the following manner:

(1) The water permeability was determined at 37° C. and at 100–300 mmHg and the permeability coefficient K' was calculated by the equation:

$$K' = V/A \cdot t \cdot \Delta P \; (ml/m^2 \cdot hr \cdot mmHg)$$

where V is the volume of permeated water (cm$^3$), A is the area of the membrane (cm$^2$), t is the permeation time (sec.), $\Delta P$ is the measuring pressure (dyne/cm$^2$)=980(13.54y+x)C(g/cm·sec$^2$), y is the height of the mercury column, and x is the height of the water column of the measuring cell.

(2) The permeabilities to solutes such as uric acid and vitamin $B_{12}$ were determined at 37° C., and the overall permeability values (Po) were calculated by the equation:

$$Po = \frac{\ln (\Delta Ct'/\Delta Ct'')}{A(1/V_1 + 1/V_2)(t'' - t')} \; (cm/min.)$$

wherein, $$\Delta Ct' = [Ct']_1 - [Ct']_2$$

$$\Delta Ct'' = [Ct'']_1 - [Ct'']_2$$

$[Ct']_1$ and $[Ct'']_1$ are the concentrations of the solution of uric acid ect. (first cell) after permeation for t' and t'' minutes respectively.

[Ct′]$_2$ and [Ct″]$_2$ are the concentrations of the solution containing solute permeated through the membrane (second cell) after permeation for t′ and t″ minutes respectively.

V$_1$ is the volume of the solution of uric acid, etc. (first cell)

V$_2$ is the volume of the solution containing permeated solute. (second cell)

The following examples illustrate the invention in more detail.

EXAMPLE 1

An ethylene-vinyl alcohol copolymer with an ethylene content of 33 mole % and a saponification degree of 99.9 mole % was dissolved in a mixed solvent of methanol and water (70/30 wt/wt) or dimethyl sulfoxide respectively to prepare polymer solutions with a concentration of 20% by weight. Membranes were prepared from each solution under various conditions. The results are shown in Table 1.

TABLE 1

| Membrane No. | Solvent | Coagulation Temperature (°C.) | Permeability to Water (ml/m² · hr · mmHg) | Uric acid (cm/min × 10⁴) | Vitamin B$_{12}$ (cm/min × 10⁴) | Appearance when wet | Moisture Content % |
|---|---|---|---|---|---|---|---|
| 1 | Methanol/water (70/30 by weight) | 2 | 5 | 20 | 0 | Opaque | — |
| 2 | Dimethyl sulfoxide | 0 | 10.5 | 115 | 33 | Transparent | 55 |
| 3 | Dimethyl sulfoxide | 4 | 15.0 | 135 | 43 | Transparent | 63 |
| 4 | Dimethyl sulfoxide | 15 | 60.0 | 105 | 17 | Opaque | 70 |
| 5 | Dimethyl sulfoxide | 30 | 180.0 | 90 | 8 | Opaque | 83 |
| 6 | Dimethyl sulfoxide | 40 | 300 | 75 | 4 | Opaque | 84 |

The membrane No. 1, obtained by using a methanol/water mixed solvent system and not within the present invention, had a honeycomb structure comprising uniform pores with sizes on the order of microns. The membranes Nos. 2 and 3, also obtained by conventional coagulation conditions, each had a substantially uniform structure. The membranes Nos. 4, 5 and 6, were obtained according to the present invention, and each had an asymmetric structure, and, when wet, was opaque. It is clear from the data that the membranes provided by the invention, as compared with the prior art membranes, have a high water permeability but low permeabilities to solutes, and therefore have those properties that render them suitable for use as filtration membranes.

EXAMPLE 2

An ethylene-vinyl alcohol copolymer with an ethylene content of 33 mole % was dissolved in dimethyl sulfoxide to prepare a solution having a polymer concentration of 22% by weight. This solution has a viscosity of 100 poises at 40° C. This spinning solution was filtered, defoamed and extruded into an aqueous bath containing 20% by weight of dimethyl sulfoxide at 20° C., using an annular nozzle (0.8 mm in outer diameter, 0.4 mm in inner diameter) and feeding air into the hollow portion. The fiber coagulated in the bath was taken up at a rate of 20 m/min. The hollow fiber thus obtained showed a water permeability of 105 ml/m².hr.mmHg and uric acid permeability of 100×10⁻⁴ cm/min. Its membrane structure was the same as that of membranes 4, 5 and 6 of Example 1.

EXAMPLE 3

The spinning procedure of Example 2 was followed except that n-hexane, a noncoagulating liquid, was fed into the hollow fiber. The hollow fiber thus obtained had a water permeability of 100 ml/m²·hr·mmHg and a uric acid permeability of 96×10⁻⁴ cm/min.

EXAMPLE 4

An ethylene-vinyl alcohol copolymer with an ethylene content of 33 mole % was dissolved in dimethyl sulfoxide with heating, to prepare a solution having a polymer concentration of 22% by weight. This solution was allowed to stand overnight at 70° C. for the purpose of defoaming. An annular nozzle having a nozzle opening diameter of 1.5 mm, a needle outer diameter of 1.13 mm and a needle inner diameter of 0.87 mm was arranged 20 mm above the coagulating bath. While feeding through the inner portion of the nozzle a mixed solvent consisting of dimethyl sulfoxide and water (45/55 wt/wt) at a rate of 1.3 cc/min., the spinning solution was extruded through the outer portion of the nozzle at a rate of 1.9 cc/min. into a coagulation bath (19° C.) consisting of a mixed solution of dimethyl sulfoxide and water (60/40 wt/wt). The spun fiber was led vertically through the air downward into the coagulation bath at a spinning rate of 9.4 m/min. The draft in air was 3.8 times. The wet hollow fiber obtained showed an almost perfectly round cross section with an outer diameter of 590 microns and a wall thickness of 80 microns. Irregularities in diameter and wall thickness could hardly be observed over a fiber length of 1 km. The fiber was thus excellent in uniformity. Electron microscopy revealed the same structure as that shown in FIG. 5. It had a water permeability (UFR) of 104 ml/m²·hr·mmHg, a uric acid permeability of 226×10⁻⁴ cm/min., and a vitamin B$_{12}$ permeability of 46×10⁻⁴ cm/min.

EXAMPLE 5

A hollow fiber membrane was produced by the same procedure as Example 4 except that water was introduced into the hollow portion and the coagulation bath of water at 23° C. The wet hollow fiber obtained had an almost perfectly round cross section with an outer diameter of 470 microns and a wall thickness of 130 microns. It had a UFR of 190 ml/m²·hr·mmHg, a uric acid permeability of 445×10⁻⁴ cm/min., and a vitamin B$_{12}$ permeability of 184×10⁻⁴ cm/min.

EXAMPLE 6-8

Hollow fibers were produced by the same procedure as Example 4 except that the nozzle was changed (in Examples 6 and 7, a nozzle having respective diameters of 1.0/0.6/0.3 mm, and in Example 8, a nozzle having a respective diameters of 2.0/0.8/0.4 mm), that the spinning rate was 10 m/min., and that the composition and temperature of the coagulation bath were varied. The details are shown in Table 2. Electron microscopy revealed that each of the hollow fibers was similar to that shown in FIG. 5 and could be used as a filtration membrane.

TABLE 2

| Example No. | 6 | 7 | 8 |
|---|---|---|---|
| Liquid fed into the hollow portion of the fiber (DMSO/water) | 45/55 | 45/55 | 45/55 |
| Draft (times) | 2.3 | 2.3 | 5.6 |
| Coagulation bath (DMSO/water) | 0/100 | 0/100 | 20/80 |
| Coagulation temperature (°C.) | 18 | 22 | 22 |
| Shape of hollow fiber (microns)  Outer diameter | 579 | 571 | 667 |
| Wall thickness | 87 | 94 | 83 |
| UFR (ml/m$^2$ . hr . mmHg) | 72.8 | 158 | 173 |

EXAMPLE 9

A hollow fiber was obtained by the same spinning procedure as in Example 4 except that water at 20° C. was fed as a coagulating liquid into the hollow fiber. This fiber had a water permeability of 91 ml/m$^2$·hr·m·m·Hg and uric acid permeability of 87×10$^{-4}$ cm/min. Electron microscopy showed that its cross section had a multilayer vacuole structure.

What is claimed is:

1. An ethylene-vinyl alcohol copolymer membrane comprising at least a skin layer on the surface thereof and a porous layer supporting said skin layer, wherein said porous layer, when said membrane is observed in the dry state with an electron microscope, comprises a plurality of vacuoles or voids, which present a mono- or multi-layer structure, with an average straight-line length corresponding to 20–99% of the whole thickness of the membrane, and the polymer portion of said porous layer comprises micropores with an average diameter of 0.1–5 microns, and said membrane has a porosity of 60–90%.

2. A membrane as claimed in claim 1, wherein said membrane is a flat membrane.

3. A flat membrane as claimed in claim 2, produced by a process which comprises dissolving an ethylene-vinyl alcohol copolymer in a solvent consisting essentially of at least one compound selected from the group consisting of dimethyl sulfoxide, dimethylacetamide, N-methylpyrrolidone and pyrrolidone to a polymer concentration, C, of 10–40% by weight, and coagulating the resulting solution in an aqueous coagulation bath, at a coagulation bath temperature, T°C., which satisfies the following relation:

when $10 \leq C < 25$, $C - 10 \leq T \leq C + 30$, and
when $25 \leq C \leq 40$, $C - 8 \leq T \leq C + 30$.

4. A membrane as claimed in claim 1, wherein said membrane is a hollow first membrane.

5. A membrane as claimed in claim 4, produced by a process which comprises dissolving an ethylene-vinyl alcohol copolymer in a solvent consisting essentially of at least one compound selected from the group consisting of dimethyl sulfoxide, dimethylacetamide, N-methylpyrrolidone and pyrrolidone, to a polymer concentration, C, of 10–40% by weight, extruding the resulting polymer solution through an annular nozzle into a coagulation bath while introducing a noncoagulating fluid through the central aperture of said nozzle, and coagulating the fiber at a coagulation bath temperature, T°C., which satisfies the following relation:

when $10 \leq C < 25$, $C - 10 \leq T \leq C + 30$, and
when $25 \leq C \leq 40$, $C - 8 \leq T \leq C + 30$.

6. A membrane as claimed in claim 4, produced by a process which comprises dissolving an ethylene-vinyl alcohol copolymer in a solvent consisting essentially of at least one compound selected from the group consisting of dimethyl sulfoxide, dimethylacetamide, N-methylpyrrolidone and pyrrolidone to a polymer concentration, C, of 15–40% by weight, extruding the resulting polymer solution through an annular nozzle into a gaseous atmosphere while introducing a coagulating liquid through the central aperture of said nozzle, passing the spun fiber through said gaseous atmosphere so that the fiber is subjected to 0.5–20 times of drafting, and coagulating the same in a coagulation bath at a coagulation temperature, T°C., satisfying the following relation:

when $15 \leq C \leq 40$, $\frac{1}{4}C + 3.5 \leq T = \frac{1}{4}C + 20$.

* * * * *

UNITED STATES PATENT AND TRADEMARK OFFICE
CERTIFICATE OF CORRECTION

PATENT NO. : 4,269,713
DATED : May 26, 1981
INVENTOR(S) : Shuzo Yamashita, Syuiji Kawai, Hirokuni Tanii, Koichi Takakura It is certified that error appears in the above—identified patent and that said Letters Patent is hereby corrected as shown below:

In Claim 4, line 2, "first" should read --fiber--.

Signed and Sealed this

Eleventh Day of August 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,269,713

DATED : May 26, 1981

INVENTOR(S) : Yamashita et al.

It is certified that error appears in the above—identified patent and that said Letters Patent is hereby corrected as shown below:

In the last line of Claim 6, "$1/4C + 3.5 \leq T = 1/4C + 20$"

should read --$1/4C + 3.5 \leq T \leq 1/4C + 20$--

Signed and Sealed this

Thirteenth Day of October 1981

[SEAL]

Attest:

GERALD J. MOSSINGHOFF

Attesting Officer

Commissioner of Patents and Trademarks